United States Patent
Mallick et al.

(10) Patent No.: US 12,306,751 B2
(45) Date of Patent: May 20, 2025

(54) HOST MULTI-PATH LAYER WITH PROXY VOLUME REDIRECTION FOR ENHANCED SCALABILITY OF DISTRIBUTED STORAGE SYSTEMS

(71) Applicant: Dell Products L.P., Round Rock, TX (US)

(72) Inventors: Sanjib Mallick, Bangalore (IN); Amit Pundalik Anchi, Bangalore (IN); David L. Black, Acton, MA (US); Ziv Dor, Rishon Letzion (IL); Rivka Mayraz Matosevich, Zichron Ya'acov (IL)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 18/244,454

(22) Filed: Sep. 11, 2023

(65) Prior Publication Data
US 2025/0086110 A1    Mar. 13, 2025

(51) Int. Cl.
*G06F 12/06* (2006.01)
*G06F 3/06* (2006.01)

(52) U.S. Cl.
CPC .......... *G06F 12/0615* (2013.01); *G06F 3/061* (2013.01); *G06F 3/0635* (2013.01); *G06F 3/0665* (2013.01); *G06F 3/067* (2013.01)

(58) Field of Classification Search
CPC .................................................. G06F 12/0615
See application file for complete search history.

(56) References Cited

U.S. PATENT DOCUMENTS

| | | | |
|---|---|---|---|
| 8,793,448 B2 * | 7/2014 | Wedlake | ............... G06F 3/0617 711/170 |
| 10,310,760 B1 | 6/2019 | Dreier et al. | |

(Continued)

FOREIGN PATENT DOCUMENTS

JP    2011118712 A    6/2011

OTHER PUBLICATIONS

Storpool Storage, "Demystifying: What is NVMeOF?" https://storpool.com/blog/demystifying-what-is-nvmeof, Sep. 12, 2017, 4 pages.

(Continued)

*Primary Examiner* — Yaima Rigol
(74) *Attorney, Agent, or Firm* — Ryan, Mason & Lewis, LLP

(57) ABSTRACT

An apparatus in an illustrative embodiment comprises at least one processing device that includes a processor coupled to a memory. The at least one processing device is configured to associate a logical storage volume with at least one path between a host and at least a given one of a plurality of storage nodes of a distributed storage system, and to associate a proxy volume with respective sets of one or more paths from the host to each of the plurality of storage nodes of the distributed storage system. The at least one processing device is further configured to obtain an input-output operation directed to the logical storage volume, and to redirect the input-output operation to the proxy volume over a selected one of the paths associated with the proxy volume. Such an arrangement can avoid one or more host-side restrictions, thereby enhancing scalability of the distributed storage system.

21 Claims, 7 Drawing Sheets

(56) References Cited

U.S. PATENT DOCUMENTS

| | | | |
|---|---|---|---|
| 10,893,105 | B1 | 1/2021 | Bono et al. |
| 11,418,594 | B1* | 8/2022 | Rao .................. H04L 67/101 |
| 11,550,511 | B2 | 1/2023 | Mallick et al. |
| 11,631,003 | B2 | 4/2023 | Martin et al. |
| 11,733,912 | B2 | 8/2023 | Chen et al. |
| 2003/0149773 | A1 | 8/2003 | Harbin et al. |
| 2007/0079081 | A1 | 4/2007 | Gladwin et al. |
| 2009/0154472 | A1 | 6/2009 | Chung et al. |
| 2009/0254572 | A1 | 10/2009 | Redlich et al. |
| 2011/0138144 | A1 | 6/2011 | Tamura et al. |
| 2012/0030424 | A1* | 2/2012 | Nunez .................. G06F 3/067 |
| | | | 711/E12.001 |
| 2013/0055249 | A1 | 2/2013 | Vaghani et al. |
| 2013/0198312 | A1 | 8/2013 | Tamir et al. |
| 2013/0226887 | A1 | 8/2013 | Braam et al. |
| 2014/0372640 | A1* | 12/2014 | Li-On .................. G06F 3/0611 |
| | | | 710/74 |
| 2015/0012607 | A1 | 1/2015 | Cayton et al. |
| 2016/0357440 | A1* | 12/2016 | Wang .................. G06F 3/0619 |
| 2017/0177216 | A1 | 6/2017 | Freyensee et al. |
| 2017/0177222 | A1 | 6/2017 | Singh et al. |
| 2018/0205635 | A1 | 7/2018 | Kim et al. |
| 2018/0239539 | A1 | 8/2018 | He et al. |
| 2019/0102093 | A1 | 4/2019 | Parnell et al. |
| 2019/0146675 | A1 | 5/2019 | Subramanian et al. |
| 2019/0377696 | A1 | 12/2019 | Patel et al. |
| 2020/0019521 | A1 | 1/2020 | Solanki et al. |
| 2020/0026606 | A1 | 1/2020 | Farnum et al. |
| 2020/0225863 | A1 | 7/2020 | Veluswamy et al. |
| 2020/0326868 | A1* | 10/2020 | Yang .................. G06F 3/0673 |
| 2021/0405915 | A1 | 12/2021 | Agarwal |
| 2021/0406678 | A1 | 12/2021 | Martin et al. |
| 2022/0374167 | A1 | 11/2022 | Mallick et al. |
| 2023/0049823 | A1* | 2/2023 | Abouelwafa ......... G06F 3/0605 |
| 2023/0229341 | A1 | 7/2023 | Chen et al. |

OTHER PUBLICATIONS

Vmware, "VMware ESX Server," Product Datasheet, 2007, 4 pages.

Wikipedia, "Host Adapter," https://en.wikipedia.org/wiki/Host_adapter, Jul. 19, 2021, 4 pages.

Wikipedia, "iSCSI," https://en.wikipedia.org/wiki/ISCSI, Dec. 22, 2021, 10 pages.

Wikipedia, "NVM Express," https://en.wikipedia.org/wiki/NVM_Express, Jan. 13, 2022, 18 pages.

A. S. Gillis, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 15, 2020, 5 pages.

Wikipedia, "Remote Direct Memory Access," https://en.wikipedia.org/wiki/Remote_direct_memory_access, Jan. 30, 2021, 3 pages.

M. Hoyt, "ScaleIO Tech Overview and Concepts: SDS-SAN vs SDS-Array," https://www.thinkahead.com/TheLAB/scaleio-tech-overview-concepts-sds-san-vs-sds-array/, Apr. 5, 2017, 16 pages.

EMC Corporation, "Emc ScaleIO Architectural and Functional Overview," EMC White Paper, Dec. 2013, 13 pages.

Dell EMC, "Dell EMC VxFlex OS: Networking Best Practices and Design Considerations," Dell EMC White Paper, Jul. 2018, 38 pages.

R. Kerns, "What is Block I/O?" searchstorage.techtarget.com/answer/What-is-block-I-O, Oct. 19, 2005, 2 pages.

Janalta Interactive, "Client-Side" https://www.techopedia.com/definition/439/client-side, Accessed Jan. 14, 2022, 8 pages.

EMC Corporation, "EMC ScaleIO Design Considerations and Best Practices," EMC White Paper, Jun. 2016, 30 pages.

Mellanox Technologies, "RoCE vs. iWARP Competitive Analysis," White Paper, Feb. 2017, 6 pages.

NVM Express, "Nvm Express Base Specification, Revision 2.0c," NVM Express, Oct. 4, 2022, 458 pages.

Dell Technologies, "Dell PowerFlex," Spec Sheet, Aug. 2023, 14 pages.

H. Strass, "An Introduction to NVMe," https://labs.seagate.com/portfolio/an-introduction-to-nvme/, May 2016, 8 pages.

U.S. Appl. No. 17/714,312, filed in the name of Igor Achkinazi et al. Apr. 6, 2022, and entitled "Storage System with Multiple Target Controllers Supporting Different Service Level Objectives."

U.S. Appl. No. 17/716,118, filed in the name of Igor Achkinazi et al. Apr. 8, 2022, and entitled "Host-Based Locality Determination for Logical Volumes Stored Across Multiple Nodes of a Distributed Storage System."

U.S. Appl. No. 17/964,560, filed in the name of Igor Achkinazi et al. Oct. 12, 2022, and entitled "Host-Based Locality Determination Using Locality Log Pages."

U.S. Appl. No. 18/335,240, filed in the name of Igor Achkinazi et al. Jun. 15, 2023, and entitled "Storage System with Automated Filtering of Discovery Information Utilizing Specified Configuration Domains."

U.S. Appl. No. 17/696,360, filed in the name of Sanjib Mallick et al. Mar. 16, 2022, and entitled "Intelligent Path Selection in a Distributed Storage System."

* cited by examiner

HOST MULTI-PATH LAYER WITH PROXY VOLUME REDIRECTION FOR ENHANCED SCALABILITY OF DISTRIBUTED STORAGE SYSTEMS

FIELD

The field relates generally to information processing systems, and more particularly to storage in information processing systems.

BACKGROUND

Information processing systems often include distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. For applications running on a host that utilizes the software-defined storage system, such a storage system provides a logical storage volume view to allow a given application to store and access data, without the application being aware that the data is being dynamically distributed among different storage nodes.

In these and other software-defined storage system arrangements, there may be significant host-side restrictions on the total number of logical storage volumes as well as the total number of paths to those volumes, thereby unduly limiting the scalability of the distributed storage system. Such scalability issues can be particularly problematic in certain types of host environments, such as, for example, VMware virtual machine environments that utilize ESXi servers and implement advanced storage access protocols such as Non-Volatile Memory Express (NVMe) over Fabrics, also referred to as NVMe-oF, or NVMe over Transmission Control Protocol (TCP), also referred to as NVMe/TCP. Similar scalability issues can arise with numerous other types of host environments.

SUMMARY

Illustrative embodiments provide techniques for proxy volume redirection in a multi-path layer of one or more hosts for enhanced scalability of a software-defined storage system or other type of distributed storage system.

Such techniques advantageously facilitate the usage of advanced storage access protocols such as NVMe-oF or NVMe/TCP while avoiding the above-described drawbacks of conventional practice. For example, some embodiments can substantially eliminate or otherwise alleviate one or more of the above-noted host-side restrictions, thereby providing significantly enhanced scalability of the distributed storage system.

Although some embodiments are described herein in the context of implementing an NVMe-oF or NVMe/TCP access protocol in a software-defined storage system, it is to be appreciated that other embodiments can be implemented in other types of distributed storage systems using other storage access protocols.

Also, although the disclosed techniques are particularly advantageous for certain types of host environments, such as VMware virtual machine environments that utilize ESXi servers, the disclosed techniques are applicable to a wide variety of other host environments utilizing other types of operating systems and/or hypervisors.

In one embodiment, an apparatus comprises at least one processing device that includes a processor coupled to a memory. The at least one processing device is configured to associate a logical storage volume with at least one path between a host and at least a given one of a plurality of storage nodes of a distributed storage system, and to associate a proxy volume with respective sets of one or more paths from the host to each of the plurality of storage nodes of the distributed storage system. The at least one processing device is further configured to obtain an input-output operation directed to the logical storage volume, and to redirect the input-output operation to the proxy volume over a selected one of the paths associated with the proxy volume.

As indicated above, such an arrangement can advantageously avoid one or more of the host-side restrictions, such as restrictions relating to the total number of paths, thereby enhancing scalability of the distributed storage system.

The at least one processing device illustratively comprises at least a portion of the host. The host illustratively comprises a plurality of initiators and supports one or more paths between each of the initiators and one or more targets on each of the storage nodes.

Additionally or alternatively, the host in some embodiments illustratively comprises a multi-path layer that includes at least one multi-path input-output driver configured to perform at least portions of associating the logical storage volume, associating the proxy volume, obtaining the input-output operation and redirecting the input-output operation.

In some embodiments, redirecting the input-output operation to the proxy volume over a selected one of the paths associated with the proxy volume comprises determining a particular portion of the logical storage volume targeted by the input-output operation, accessing at least one data structure to identify a particular one of the plurality of storage nodes that stores data of the particular portion of the logical storage volume, and selecting a particular path from the set of one or more paths from the host to the identified storage node. The at least one data structure illustratively comprises a table or other arrangement of mapping information that maps portions of the logical storage volume to respective ones of the storage nodes that store data of those portions.

In some embodiments, the logical storage volume is associated with no more than a maximum number of paths for the logical storage volume and the proxy volume is associated with a number of paths that is substantially larger than the maximum number of paths for the logical storage volume. For example, the maximum number of paths for the logical storage volume may be two paths, and the proxy volume may be associated with a much larger number of paths that is a function of the number of storage nodes in the plurality of storage nodes.

The distributed storage system in some embodiments may more particularly comprise, for example, a software-defined storage system in which the storage nodes illustratively comprise respective software-defined storage server nodes of the software-defined storage system. Numerous other types and arrangements of distributed storage systems can be used in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
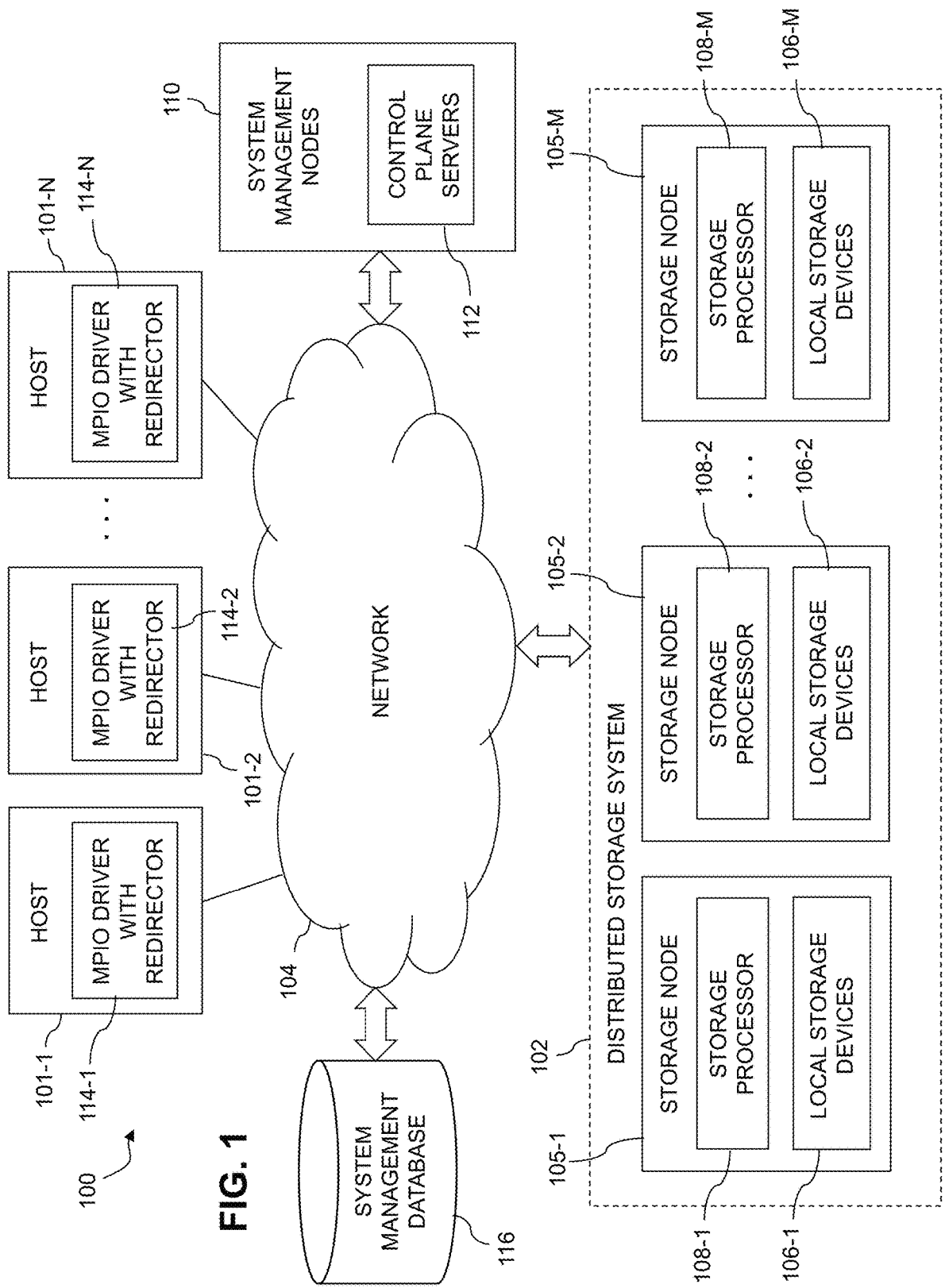
FIG. 1 is a block diagram of an information processing system incorporating functionality for proxy volume redirection in an illustrative embodiment.

FIG. 1 shows an information processing system 100 configured in accordance with an illustrative embodiment. The information processing system 100 comprises a plurality of hosts 101-1, 101-2, . . . 101-N, collectively referred to herein as hosts 101, and a distributed storage system 102 shared by the hosts 101. The hosts 101 and distributed storage system 102 in this embodiment are configured to communicate with one another via a network 104 that illustratively utilizes protocols such as Transmission Control Protocol (TCP) and Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

It should be noted that the term "host" as used herein is intended to be broadly construed, so as to encompass, for example, a host device or a host system, each of which may comprise multiple distinct devices of various types. A host in some embodiments can comprise, for example, at least one server, as well as additional or alternative types and arrangements of processing devices.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical identifier (e.g., address) space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments. Examples of such software-defined storage systems will be described in more detail below in conjunction with FIG. 5.

It is to be appreciated, however, that techniques disclosed herein can be implemented in other embodiments in stand-alone storage arrays or other types of storage systems that are not distributed across multiple storage nodes. The disclosed techniques are therefore applicable to a wide variety of different types of storage systems. The distributed storage system 102 is just one illustrative example.

In the distributed storage system 102, each of the storage nodes 105 is illustratively configured to interact with one or more of the hosts 101. The hosts 101 illustratively comprise servers or other types of computers of an enterprise computer system, cloud-based computer system or other arrangement of multiple compute nodes, each associated with one or more system users.

The hosts 101 in some embodiments illustratively provide compute services such as execution of one or more applications on behalf of each of one or more users associated with respective ones of the hosts 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as outstanding IOs that have been admitted by the storage nodes 105 to further processing within the system 100. The storage nodes 105 are illustratively configured to queue IO operations arriving from one or more of the hosts 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms. In the case of separate processing platforms, there may be a single storage node per processing platform or multiple storage nodes per processing platform.

The hosts 101 are illustratively configured to write data to and read data from the distributed storage system 102 comprising storage nodes 105 in accordance with applications executing on those hosts 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) interface cards and/or other types of interfaces of those devices, including, again by way of example, LAN On Motherboard (LOM) network interface cards (NICs) or other types of NICs. Such devices, together with associated host software such as, for example, IO drivers, networking stacks and/or other components, illustratively support networking protocols such as InfiniBand or Fibre Channel, in addition to or in place of TCP/IP. Numerous alternative networking arrangements are possible in a given embodiment, as will be appreciated by those skilled in the art. Additional examples include remote direct memory access (RDMA) over Converged Ethernet (RoCE), illustratively RoCEv2, or RDMA over iWARP.

The first storage node 105-1 comprises a plurality of storage devices 106-1 and an associated storage processor 108-1. The storage devices 106-1 illustratively store metadata and user data associated with one or more storage volumes of the distributed storage system 102. The storage volumes illustratively comprise respective logical units (LUNs) or other types of logical storage volumes (e.g., NVMe namespaces). The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage processor 108-2, and storage node 105-M comprises a plurality of storage devices 106-M and an associated storage processor 108-M.

As indicated previously, the storage devices 106-2 through 106-M illustratively store metadata and user data associated with one or more storage volumes of the distributed storage system 102, such as the above-noted LUNs, NVMe namespaces or other types of logical storage volumes. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node.

The storage processors 108 of the storage nodes 105 may include additional modules and other components typically found in conventional implementations of storage processors and storage systems, although such additional modules and other components are omitted from the figure for clarity and simplicity of illustration.

Additionally or alternatively, the storage processors 108 in some embodiments can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, and spin torque transfer magneto-resistive RAM (STT-MRAM), among numerous other NVM device types known to those skilled in the art. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices of the storage nodes 105 of the distributed storage system of FIG. 1.

In some embodiments, the storage nodes 105 collectively provide a distributed storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the hosts 101 and the storage nodes 105 comprise NVMe commands of an NVMe storage access protocol, for example, as described in the NVM Express Base Specification, Revision 2.0c, October 2022, and its associated NVM Express Command Set Specification and NVM Express TCP Transport Specification, all of which are incorporated by reference herein. Other examples of NVMe storage access protocols that may be utilized in illustrative embodiments disclosed herein include NVMe over Fabrics, also referred to herein as NVMe-oF, and NVMe over TCP, also referred to herein as NVMe/TCP. Other embodiments can utilize other types of storage access protocols. As another example, communications between the hosts 101 and the storage nodes 105 in some embodiments can comprise Small Computer System Interface (SCSI) commands and the Internet SCSI (iSCSI) protocol.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102. Other embodiments can utilize other data protection techniques, such as, for example, Erasure Coding (EC), instead of one or more RAID arrangements.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage processors 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes a plurality of devices, each illustratively a different physical storage device of the storage devices 106.

Multiple such physical storage devices are typically utilized to store data of a given LUN, NVMe namespace or other logical storage volume in the distributed storage system. For example, data pages or other data blocks of a given LUN, NVMe namespace or other logical storage volume can be "striped" along with its corresponding parity information across multiple ones of the devices in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the devices to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the devices to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are illustratively interconnected with one another in a full mesh network, or other topology providing full any-to-any network connectivity, and are collectively managed by a system manager. A given set of local persistent storage devices on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises a plurality of system management nodes 110 that are illustratively configured to provide system management functionality of the type noted above. Such functionality in the present embodiment illustratively further involves utilization of control plane servers 112 and a system management database 116. In some embodiments, at least portions of the system management nodes 110 and their associated control plane servers 112 are distributed over the storage nodes 105. For example, a designated subset of the storage nodes 105 can each be configured to include a corresponding one of the control plane servers 112. Other system management functionality provided by system management nodes 110 can be similarly distributed over a subset of the storage nodes 105.

The system management database 116 stores configuration and operation information of the system 100 and portions thereof are illustratively accessible to various system administrators such as host administrators and storage administrators.

The hosts 101-1, 101-2, . . . 101-N include respective MPIO drivers 114-1, 114-2, . . . 114-N, each of which is assumed to comprise a redirector as well as other path selection logic. The MPIO drivers 114 are illustratively utilized in supporting functionality for proxy volume redirection for enhanced scalability of the distributed storage system 102, as described in more detail below.

In some embodiments, each of the storage nodes 105 of the distributed storage system 102 is assumed to comprise multiple controllers associated with a corresponding target of that storage node. Such a "target" as that term is broadly used herein is illustratively a destination end of one or more paths from one or more of the hosts 101 to the storage node, and may comprise, for example, an NVM subsystem of the storage node, although other types of targets can be used in other embodiments. It should be noted that different types of targets may be present in NVMe embodiments than are present in other embodiments that use other storage access protocols, such as SCSI embodiments. Accordingly, the types of targets that may be implemented in a given embodiment can vary depending upon the particular storage access protocol being utilized in that embodiment, and/or other factors. Similarly, the types of initiators can vary depending upon the particular storage access protocol, and/or other factors. Again, terms such as "initiator" and "target" as used herein are intended to be broadly construed, and should not be viewed as being limited in any way to particular types of components associated with any particular storage access protocol.

The paths that are selected by instances of path selection logic in the MPIO drivers 114 of the respective hosts 101 for delivering IO operations from the hosts 101 to the distributed storage system 102 are associated with respective initiator-target pairs, as described in more detail elsewhere herein.

In some embodiments, IO operations are processed in the hosts 101 utilizing their respective MPIO drivers 114 in the following manner. A given one of the hosts 101 establishes a plurality of paths between at least one initiator of the given host and a plurality of targets of respective storage nodes 105 of the distributed storage system 102. For each of a plurality of IO operations generated in the given host for delivery to the distributed storage system 102, the host selects a path to a particular target, and sends the IO operation to the corresponding storage node over the selected path.

The given host above is an example of what is more generally referred to herein as "at least one processing device" that includes a processor coupled to a memory. The storage nodes 105 of the distributed storage system 102 are also examples of "at least one processing device" as that term is broadly used herein.

It is to be appreciated that path selection as disclosed herein can be performed independently by each of the hosts 101, illustratively utilizing their respective MPIO drivers 114 and their corresponding redirectors and other path selection logic, as indicated above, with possible involvement of additional or alternative system components.

In some embodiments, the initiator of the given host and the targets of the respective storage nodes 105 are configured to support one or more designated standard storage access protocols, such as an NVMe access protocol or a SCSI access protocol. As more particular examples in the NVMe context, the designated storage access protocol may comprise an NVMe/FC or NVMe/TCP access protocol, although a wide variety of additional or alternative storage access protocols can be used in other embodiments.

The hosts 101 can comprise additional or alternative components. For example, in some embodiments, the hosts 101 further comprise respective sets of IO queues associated with respective ones of the MPIO drivers 114. The MPIO drivers 114 collectively comprise a multi-path layer of the hosts 101. Path selection functionality for delivery of IO operations from the hosts 101 to the distributed storage system 102 is provided in the multi-path layer by respective instances of redirectors and other path selection logic implemented within the corresponding MPIO drivers 114.

The MPIO drivers 114 may comprise, for example, otherwise conventional MPIO drivers, such as PowerPath® drivers from Dell Technologies, suitably modified in the manner disclosed herein to include respective redirectors and to provide one or more portions of the disclosed functionality for proxy volume redirection. Other types of MPIO drivers from other driver vendors may be suitably modified to incorporate one or more portions of the functionality for proxy volume redirection as disclosed herein.

In some embodiments, the hosts 101 comprise respective local caches, implemented using respective memories of those hosts. A given such local cache can be implemented using one or more cache cards. A wide variety of different caching techniques can be used in other embodiments, as will be appreciated by those skilled in the art. Other examples of memories of the respective hosts 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers 114 are illustratively configured to deliver IO operations selected from their respective sets of IO queues to the distributed storage system 102 via selected ones of multiple paths over the network 104. The sources of the IO operations stored in the sets of IO queues illustratively include respective processes of one or more applications executing on the hosts 101. For example, IO operations can be generated by each of multiple processes of a database application running on one or more of the hosts 101. Such processes issue IO operations for delivery to the distributed storage system 102 over the network 104. Other types of sources of IO operations may be present in a given implementation of system 100.

A given IO operation is therefore illustratively generated by a process of an application running on a given one of the hosts 101, and is queued in one of the IO queues of the given host with other operations generated by other processes of that application, and possibly other processes of other applications.

The paths from the given host to the distributed storage system 102 illustratively comprise paths associated with respective initiator-target pairs, with each initiator comprising, for example, a port of a single-port or multi-port host bus adaptor (HBA) or other initiating entity of the given host and each target comprising a port or other targeted entity corresponding to one or more of the storage devices 106 of the distributed storage system 102. As noted above, the storage devices 106 illustratively comprise LUNs, NVMe namespaces or other types of logical storage devices.

In some embodiments, the paths are associated with respective communication links between the given host and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

Accordingly, in some embodiments, multiple virtual initiators are associated with a single HBA of a given one of the hosts 101 but have respective unique identifiers associated therewith.

Additionally or alternatively, different ones of the multiple virtual initiators are illustratively associated with respective different ones of a plurality of virtual machines of the given host that share a single HBA of the given host, or a plurality of logical partitions of the given host that share a single HBA of the given host.

Numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host in delivering IO operations from the IO queues of that host to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. For example, in the case of write requests, such commands are assumed to have various payload sizes associated therewith, and the payload associated with a given command may be referred to as its "command payload." Other arrangements are used for read requests, with the payload moving in the opposite direction.

A command directed by the given host to the distributed storage system 102 is considered an "outstanding" command until such time as its execution is completed in the viewpoint of the given host, at which time it is considered a "completed" command. The commands illustratively comprise respective NVMe commands, although other command formats, such as SCSI command formats, can be used in other embodiments. In the SCSI context, a given such command is illustratively defined by a corresponding command descriptor block (CDB) or similar format construct. The given command can have multiple blocks of payload associated therewith, such as a particular number of 512-byte SCSI logical blocks or other sizes and/or structures of logical blocks. Other command formats, e.g., Submission Queue Entry (SQE), are utilized in the NVMe context.

In illustrative embodiments to be described below, it is assumed without limitation that the initiators of a plurality of initiator-target pairs comprise or are otherwise associated with respective ports of the given host and that the targets of the plurality of initiator-target pairs comprise or are otherwise associated respective ports of the distributed storage system 102, although numerous other initiator-target arrangements are possible, and such terms are therefore intended to be broadly construed herein, and should not be viewed as limited to particular interface types, such as SCSI or NVMe interfaces. Non-limiting examples of host ports and storage array ports are illustrated in conjunction with the embodiment of FIG. 5. The host ports can comprise, for example, ports of single-port HBAs and/or ports of multi-port HBAs, or other types of host ports, including NICs. Again, a wide variety of other types and arrangements of initiators and targets can be used in other embodiments.

Selecting a particular one of multiple available paths for delivery of a selected one of the IO operations from the given host is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume (e.g., an NVMe namespace) to which the particular IO operation is directed.

It should be noted that paths may be added or deleted between the hosts 101 and the distributed storage system 102 in the system 100. For example, the addition of one or more new paths from the given host to the distributed storage system 102 or the deletion of one or more existing paths from the given host to the distributed storage system 102 may result from respective addition or deletion of at least a portion of the storage devices 106 of the distributed storage system 102.

Addition or deletion of paths can also occur as a result of zoning and masking changes or other types of storage system reconfigurations performed by a storage administrator or other user. Some embodiments are configured to send a predetermined command from the given host to the distributed storage system 102, illustratively utilizing the MPIO driver, to determine if zoning and masking information has been changed. The predetermined command can comprise, for example, in the SCSI context, a log sense command, a mode sense command, a "vendor unique command" or VU command, or combinations of multiple instances of these or other commands, in an otherwise standardized command format. Analogous NVMe commands include Get Log Page and Get Features commands.

In some embodiments, paths are added or deleted in conjunction with, for example, load rebalancing among storage nodes, or under other conditions such as addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPathR drivers.

The path discovery scan in some embodiments may be further configured to identify one or more new LUNs, NVMe namespaces or other logical storage volumes associated with the one or more new paths identified in the path discovery scan. The path discovery scan may comprise, for example, one or more scans that are configured to discover the appearance of any new LUNs or NVMe namespaces that have been added to the distributed storage system 102 as well to discover the disappearance of any existing LUNs or NVMe namespaces that have been deleted from the distributed storage system 102.

The MPIO driver of the given host in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an operating system kernel of the given host.

For each of one or more new paths identified in the path discovery scan, the given host may be configured to execute a host registration operation for that path. The host registration operation for a given new path illustratively provides notification to the distributed storage system 102 that the given host has discovered the new path.

As indicated previously, the storage nodes 105 of the distributed storage system 102 process IO operations from one or more hosts 101 and in processing those IO operations run various storage application processes that generally involve interaction of that storage node with one or more other ones of the storage nodes.

In the FIG. 1 embodiment, the distributed storage system 102 comprises storage processors 108 and corresponding sets of storage devices 106, and may include additional or alternative components, such as sets of local caches.

The storage processors 108 illustratively control the processing of IO operations received in the distributed storage system 102 from the hosts 101. For example, the storage processors 108 illustratively manage the processing of read and write commands directed by the MPIO drivers of the hosts 101 to particular ones of the storage nodes 105. This processing illustratively includes, for example, a given one of the storage processors 108 on a given one of the storage nodes 105 directing read requests and/or write requests received from one or more of the hosts 101 to local storage devices on the given storage node and/or local storage devices on one or more other ones of the storage nodes 105.

The storage processors 108 can be implemented as respective storage controllers, directors or other storage system components configured to control storage system operations relating to processing of IO operations. In some embodiments, each of the storage processors 108 has a different one of the above-noted local caches associated therewith, although numerous alternative arrangements are possible.

Proxy Volume Redirection

The manner in which functionality for proxy volume redirection is implemented in system 100 will now be described in more detail.

As indicated previously, in many distributed storage systems, including software-defined storage system arrangements utilizing advanced storage access protocols such as NVMe-oF or NVMe/TCP, scalability can be unduly limited due to host-side restrictions on the total number of logical storage volumes and the total number of paths to those logical storage volumes. These scalability issues can be particularly problematic in certain types of host environments, such as, for example, VMware virtual machine environments that utilize ESXi servers to implement advanced storage access protocols such as NVMe-oF or NVMe/TCP. Similar scalability issues can arise with numerous other types of host environments.

Illustrative embodiments disclosed herein address and overcome these and other issues of conventional practice by providing techniques for proxy volume redirection in a multi-path layer of one or more hosts for enhanced scalability of a software-defined storage system or other type of distributed storage system.

Such techniques advantageously facilitate the usage of advanced storage access protocols such as NVMe-oF or NVMe/TCP while avoiding the above-described drawbacks of conventional practice. For example, some embodiments can substantially eliminate or otherwise alleviate one or more of the above-noted host-side restrictions, thereby providing significantly enhanced scalability of the distributed storage system.

Although some embodiments are described herein in the context of implementing an NVMe-oF or NVMe/TCP access protocol in a software-defined storage system, it is to be appreciated that other embodiments can be implemented in other types of distributed storage systems using other storage access protocols.

Also, although the disclosed techniques are particularly advantageous for certain types of host environments, such as VMware virtual machine environments that utilize ESXi servers, the disclosed techniques are applicable to a wide variety of other host environments utilizing other types of operating systems and/or hypervisors.

As mentioned above, each of the storage nodes 105 of the distributed storage system 102 illustratively comprises one or more targets, where each such target is associated with multiple distinct paths from respective HBAs or other initiators of one or more of the hosts 101.

For example, in some embodiments, one or more of the storage nodes 105 each implements at least one target, such as an NVMe target as further described herein, that is configured to include multiple controllers, such as at least a first controller associated with a first storage pool, and a second controller associated with a second storage pool. The first and second storage pools are illustratively storage pools of the distributed storage system 102, and such storage pools may be distributed across multiple ones of the storage nodes 105. Each of the first and second storage pools is assumed to comprise one or more LUNs, NVMe namespaces or other logical storage volumes.

Although first and second controllers are referred to in conjunction with some embodiments herein, it is to be appreciated that more than two controllers can be implemented in a given target in order to support more than two storage pools.

A given one of the storage nodes 105 illustratively processes IO operations received from one or more of the hosts 101, with different ones of the IO operations being directed by the one or more hosts 101 from one or more initiators of the one or more hosts 101 to different ones of a plurality of targets implemented within the storage nodes.

The proxy volume redirection in such an embodiment is illustratively implemented in the following manner.

A given one of the hosts 101, illustratively at least in part via its corresponding one of the MPIO drivers 114, associates a logical storage volume with at least one path between the host and at least a given one of the storage nodes 105 of the distributed storage system 102, and associates a proxy volume with respective sets of one or more paths from the host to each of the plurality of storage nodes 105 of the distributed storage system 102. The MPIO driver of the given host obtains an IO operation directed to the logical storage volume, and utilizes its corresponding redirector to redirect the IO operation to the proxy volume over a selected one of the paths associated with the proxy volume.

It should be noted that the term "path" as used herein is intended to be broadly construed, and should not be viewed as limited to particular path types associated with particular interfaces such as NVMe or SCSI. For example, in some embodiments, a path may be associated with an initiator-target pair, also referred to in some embodiments as an initiator-target nexus or an IT nexus, and/or a particular LUN, NVMe namespace or other logical storage volume, also referred to in some embodiments as an ITL nexus. Paths in some embodiments may comprise, for example, NVMe associations. Other types and arrangements of paths may be used in other embodiments disclosed herein.

The host in this embodiment may be viewed as an example of what is more generally referred to herein as "at least one processing device" comprising a processor and a memory, with the processor coupled to the memory. Other arrangements of one or more processing devices can be configured to implement the disclosed proxy volume redirection functionality in other embodiments.

The host illustratively comprises a plurality of initiators and supports one or more paths between each of the initiators and one or more targets on each of the storage nodes.

In some embodiments, the logical storage volume is associated with at least first and second paths between the host and the given storage node of the plurality of storage nodes.

By way of example only, redirecting the IO operation to the proxy volume over a selected one of the paths associated with the proxy volume in some embodiments illustratively comprises determining a particular logical block address (LBA) range or other portion of the logical storage volume targeted by the IO operation, accessing at least one data structure to identify a particular one of the plurality of storage nodes 105 that stores data of the particular portion of the logical storage volume, and selecting a particular path from the set of one or more paths from the host to the identified storage node.

Other types of redirection can be used in other embodiments, as described elsewhere herein. For example, one or more such embodiments assume that the mapping information is illustratively made available to the host by the storage system using any of a number of different techniques known to those skilled in the art, and that such mapping information is then utilized by the host in determining an appropriate storage node to which a given IO operation should be directed. Embodiments disclosed herein are therefore not limited in terms of the particular type of redirection that is applied.

In some embodiments, the above-noted at least one data structure illustratively comprises a table or other arrangement of stored mapping information that maps LBA ranges or other portions of the logical storage volume to respective ones of the storage nodes 105 that store data of those portions. The mapping information in some embodiments is obtained at least in part from one or more of the storage nodes 105. Additionally or alternatively, the mapping information is illustratively updated, periodically or under other specified conditions, to reflect configuration changes relating to the distributed storage system 102, such as addition or deletion of one or more storage nodes 105.

In some embodiments, the logical storage volume is associated with no more than a maximum number of paths for the logical storage volume, and the proxy volume is associated with a number of paths that is substantially larger than the maximum number of paths for the logical storage volume.

For example, the maximum number of paths for the logical storage volume may be two paths, and the proxy volume may be associated with a number of paths that is a function of the number of storage nodes in the plurality of storage nodes, such as M paths or 2M paths, where M denotes the number of storage nodes.

The maximum number of paths for the logical storage volume may be, for example, a particular number of paths that is specified or otherwise designated as the maximum number of paths for the logical storage volume within a given system configuration. Such a specification or other designation of a maximum number of paths for the logical storage volume may be made, for example, by an administrator or other user.

In some embodiments, multiple unique proxy volumes can be used, each adhering to the maximum number of paths for the logical storage volume.

Additionally or alternatively, multiple proxy volumes can be used to access disparate sets of storage nodes, such as, for example, on different storage systems, or in different protection domains of a given storage system.

In some embodiments, the target of a given initiator-target pair providing a path from a host to a given storage node comprises an NVMe controller, although a wide variety of other types of targets can be used in other embodiments. The term "target" as used herein in the context of a distributed storage system or other type of storage system is therefore intended to be broadly construed.

The target in some embodiments more particularly comprises multiple controllers accessible via respective different associations comprising one or more TCP connections between the given host and the given storage node. For example, the target may comprise a plurality of NVMe controllers of an NVM subsystem that is at least partially resident on the given storage node.

Accordingly, in some embodiments, multiple controllers are part of a single physical controller component of the given storage node. For example, first and second controllers may comprise respective NVMe controllers of an NVM subsystem that is at least partially resident on the given storage node. Such components may be viewed as examples of what are more generally referred to herein as a "target" of the given storage node. Other types of targets comprising one or more controllers can be used in other embodiments.

The first and second controllers in some embodiments may be viewed as comprising respective "virtual" controllers associated with the single physical controller component of the given storage node.

Additionally or alternatively, the first and second controllers in some embodiments are accessible via respective first and second different associations comprising one or more TCP connections between a given one of the one or more hosts 101 and the given storage node. In such an arrangement, a host accesses the first controller using the first association, and accesses the second controller using the second association. Other types of communication links can be used in other embodiments.

In some embodiments, the first controller comprises a first set of IO queues and the second controller comprises a second set of IO queues, for use in processing IO operations for their respective storage pools. Other types of queues, such as, for example, Admin queues, can additionally or alternatively be used.

An additional example of an illustrative process for implementing at least some of the above-described proxy volume redirection functionality will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

Also, the term "storage volume" as used herein is intended to be broadly construed, and should not be viewed as being limited to any particular format or configuration.

In some embodiments, the storage nodes 105 are implemented using processing modules that are interconnected, for example, in a full mesh network or other topology providing full any-to-any network connectivity, such that a process of one of the processing modules can communicate with processes of any of the other processing modules. Commands issued by the processes can include, for example, remote procedure calls (RPCs) and/or application programming interface (API) invocations directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in a full mesh network or other topology providing full any-to-any network connectivity, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and RoCEv2. For example, respective sets of IP links used in data transfer and corresponding messaging could be associated with respective different ones of the routing modules.

The particular features described above in conjunction with FIG. 1 should not be construed as limiting in any way, and a wide variety of other system arrangements implementing proxy volume redirection as disclosed herein are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated hosts 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the hosts 101 and the storage nodes 105 to reside in different data centers. Numerous other distributed implementations of the storage nodes 105 and their respective associated sets of hosts 101 are possible.

Additional examples of processing platforms utilized to implement storage systems and possibly their associated hosts in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as hosts 101, distributed storage system 102, storage nodes 105, storage devices 106, storage processors 108, system management nodes 110 and MPIO drivers 114 can be used in other embodiments. For example, as mentioned previously, system management functionality of system management nodes 110 can be distributed across a subset of the storage nodes 105, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of proxy volume redirection functionality as disclosed herein can be implemented in one or more hosts, in a storage system, or partially in a host and partially in a storage system. Accordingly, illustrative embodiments are not limited to arrangements in which proxy volume redirection functionality is implemented primarily in storage system or primarily in a particular host or set of hosts, and therefore such embodiments encompass various alternative arrangements, such as, for example, an arrangement in which the functionality is distributed over one or more storage systems and one or more associated hosts, each comprising one or more processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for proxy volume redirection as disclosed herein. This process may be viewed as an example algorithm implemented at least in part by one or more of the hosts 101 interacting with distributed storage system 102. These and other algorithms for proxy volume redirection as disclosed herein can be implemented using other types and arrangements of system components in other embodiments.

Figure 2:
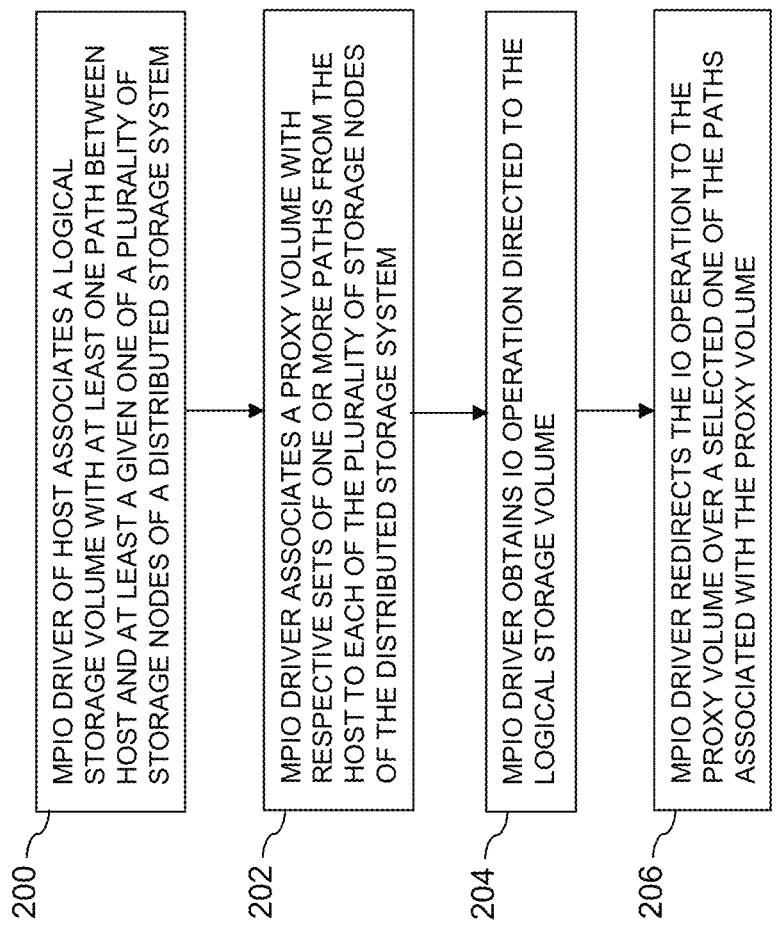
FIG. 2 is a flow diagram of a process for proxy volume redirection in an illustrative embodiment.

The process illustrated in FIG. 2 includes steps 200 through 206, and is assumed to be implemented primarily by an MPIO driver of a given host, such as one of the MPIO drivers 114 in one of the host 101 of the system 100, utilizing a proxy volume redirector deployed in the MPIO driver. Similar processes may be implemented primarily by other MPIO drivers of respective other hosts, and may also be implemented at least in part utilizing additional or alternative host drivers or other host components.

It should again be noted that the term "path" as used in this embodiment and other embodiments herein is intended to be broadly construed, and should not be viewed as limited to particular path types associated with particular interfaces such as NVMe or SCSI. For example, a given path can comprise or be otherwise associated with an IT nexus and/or an ITL nexus, or additional or alternative arrangements, and the disclosed embodiments are not limited in this regard.

In step 200, an MPIO driver of a given host associates a logical storage volume with at least one path between the host and at least a given one of a plurality of storage nodes of a distributed storage system. This may involve, for example, establishing, configuring and/or identifying the logical storage volume, and specifying one or more paths for accessing the logical storage volume on at least one of the storage nodes. Numerous other techniques can be used to establish, configure, identify or otherwise associate one or more paths with a given logical storage volume. The term "associating" as used in this and other similar contexts herein is therefore intended to be broadly construed.

In step 202, the MPIO driver associates a proxy volume with respective sets of one or more paths from the host to each of the plurality of storage nodes of the distributed storage system. This may involve, for example, establishing, configuring and/or identifying the proxy volume, and specifying one or more paths for accessing the proxy volume on each of the storage nodes, although as indicated above, numerous other techniques can be used. The associations referred to in steps 200 and 202 can be established at least in part using additional or alternative host components in other embodiments.

In step 204, the MPIO driver obtains an IO operation directed to the logical storage volume. Such an IO operation may be obtained, for example, from an application that generates the IO operation in order to write to or read from the logical storage volume. It may be placed in one or more host IO queues prior to or in conjunction with being received or otherwise obtained by the MPIO driver.

In step 206, the MPIO driver redirects the IO operation to the proxy volume over a selected one of the paths associated with the proxy volume. This redirection is illustratively performed by a redirector implemented in the MPIO driver, although numerous other redirection arrangements are possible. For example, redirecting the IO to the proxy volume over a selected one of the paths associated with the proxy volume may comprise determining a particular LBA range or other portion of the logical storage volume targeted by the IO operation, accessing at least one data structure to identify a particular one of the plurality of storage nodes that stores data of the particular portion of the logical storage volume, and selecting a particular path from the set of one or more paths from the host to the identified storage node. In some embodiments, the at least one data structure comprises a table or other arrangement of stored mapping information that maps LBA ranges or other portions of the logical storage volume to respective ones of the storage nodes that store data of those portions. In some embodiments, the mapping information is obtained by the host at least in part from one or more of the storage nodes, and is updated periodically or under other specified conditions to reflect configuration changes relating to the distributed storage system.

It should be noted that the host in some embodiments provides information on the IO redirected to the proxy volume that allows the storage system to re-associate the IO with the original addressing. This can involve, for example, selecting an LBA on the proxy volume, specifying additional data as part of the IO, or using other techniques. Additionally or alternatively, a namespace identifier (NSID) or other logical storage volume identifier known to the host can be used.

Steps 204 and 206 are illustratively repeated for one or more additional IO operations directed to the logical storage volume over time in order to support the disclosed proxy volume redirection functionality. Multiple such processes may operate in parallel with one another in order to provide proxy volume redirection functionality for different logical storage volumes and their respective corresponding hosts.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations for implementing proxy volume redirection for one or more hosts interacting with a storage system. For example, as indicated above, the ordering of the process steps may be varied in other embodiments, or certain steps may be performed at least in part concurrently with one another rather than serially. Also as indicated previously, one or more of the process steps may be repeated periodically, or multiple instances of the process can be performed in parallel with one another in order to implement a plurality of different processes for respective different hosts.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

One or more hosts and/or one or more storage nodes can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Hosts, storage processors and other system components may be implemented at least in part using processing devices of such processing platforms. For example, respective path selection logic instances and other related logic instances of the hosts can be implemented in respective virtual machines running on respective ones of the processing devices of a processing platform.

Additional examples of illustrative embodiments will now be described with reference to FIGS. 3 through 5.

Figure 3:
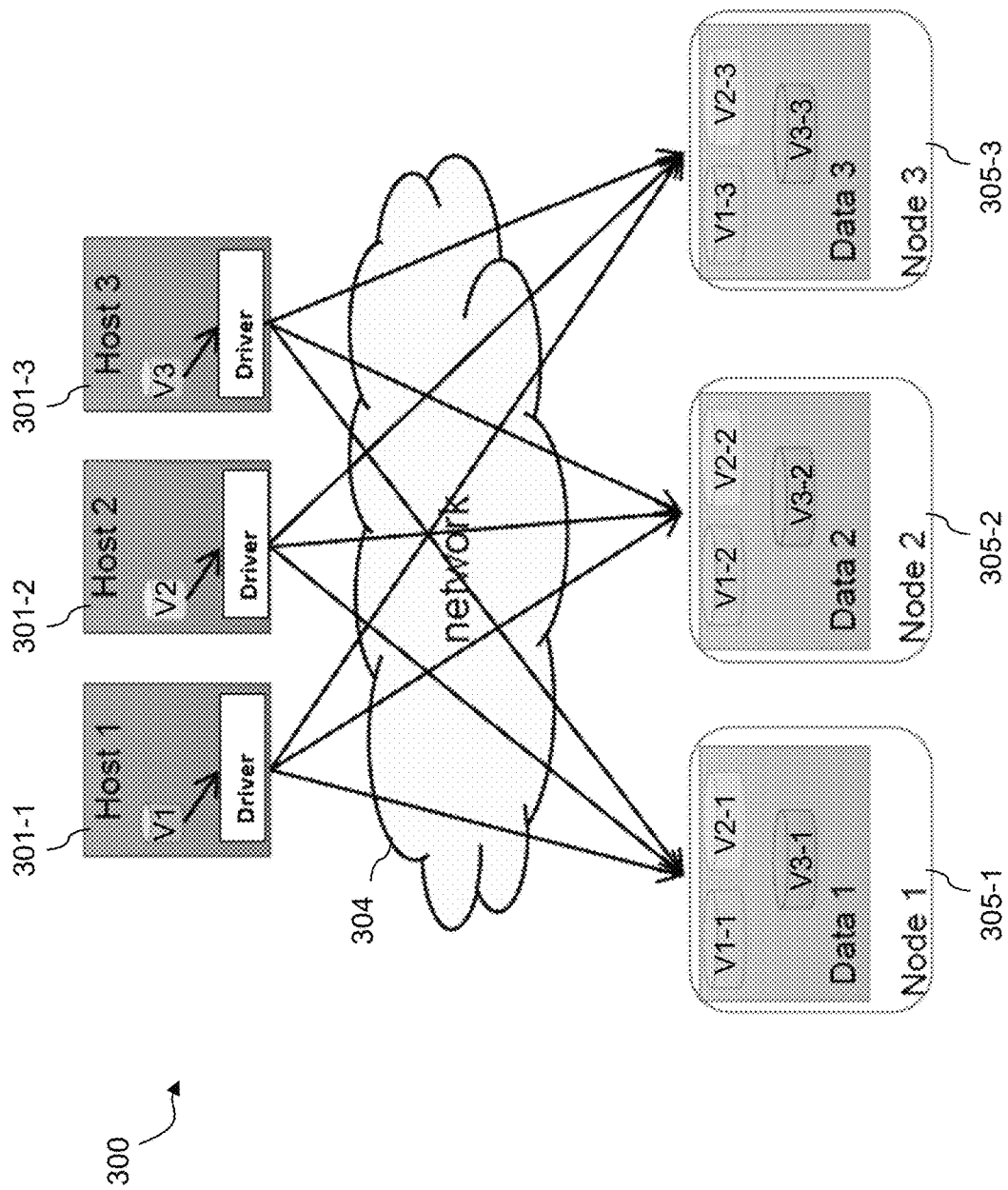
FIG. 3 shows an example distribution of different portions of multiple logical storage volumes across different storage nodes of a distributed storage system in an illustrative embodiment.

Referring initially to FIG. 3, an information processing system 300 comprises three hosts 301-1, 301-2 and 301-3, also denoted as Host 1, Host 2 and Host 3, that utilize respective logical storage volumes V1, V2 and V3. The hosts 301 communicate via respective drivers thereof over a network 304 with three storage nodes 305-1, 305-2 and 305-3, also denoted as Node 1, Node 2 and Node 3. In other embodiments, more or fewer hosts and/or more or fewer storage nodes may be used.

The data of the logical storage volumes is distributed across the storage nodes 305 as illustrated, with first, second and third portions of V1, denoted as V1-1, V1-2 and V1-3, being stored on Node 1, Node 2 and Node 3, respectively. Similarly, first, second and third portions of V2, denoted as V2-1, V2-2 and V2-3, are stored on Node 1, Node 2 and Node 3, respectively, and first, second and third portions of V3, denoted as V3-1, V3-2 and V3-3, are stored on Node 1, Node 2 and Node 3, respectively.

In this simplified example with only three storage nodes 305, each of the hosts 301 illustratively has access via its corresponding driver to each of the different portions of its corresponding logical storage volume V1, V2 or V3 on each of the storage nodes 305. Each of the logical storage volumes V1, V2 and V3 is distributed over all of the storage nodes 305, so that maximum parallelism can be achieved.

More generally, for a distributed storage system with n nodes and v volumes, the total path count without proxy volume redirection of the type disclosed herein is at least $2*n*v$, where the factor of two is for path redundancy to each node. In the illustrative embodiment of FIG. 3, each arrow may therefore denote two paths for redundancy, although more or fewer paths may be used in other embodiments.

As indicated previously, in these and other arrangements in which data of logical storage volumes is distributed over multiple storage nodes of a distributed storage system, there are host-side limitations on the number of logical storage volumes and the number of paths. For example, in some VMware ESXi environments, the total number of logical storage volumes and the total number of paths to all volumes are subject to limitations. Assume for purposes of illustration only that these limitations on the total number of logical storage volumes and the total number of paths to all volumes are 256 volumes and 4096 paths, respectively, as NVMe/TCP-specific limitations. An example configuration with 64 volumes distributed across 32 nodes using two path per node redundancy will reach the path limit of 4096, with the total path count being given by $2*n*v=2*32*64=4096$, even though it may be desirable to have the storage system support a much larger number of volumes and paths. Analogous limits on volumes and paths exist in other operating systems and hypervisors.

Figure 4:
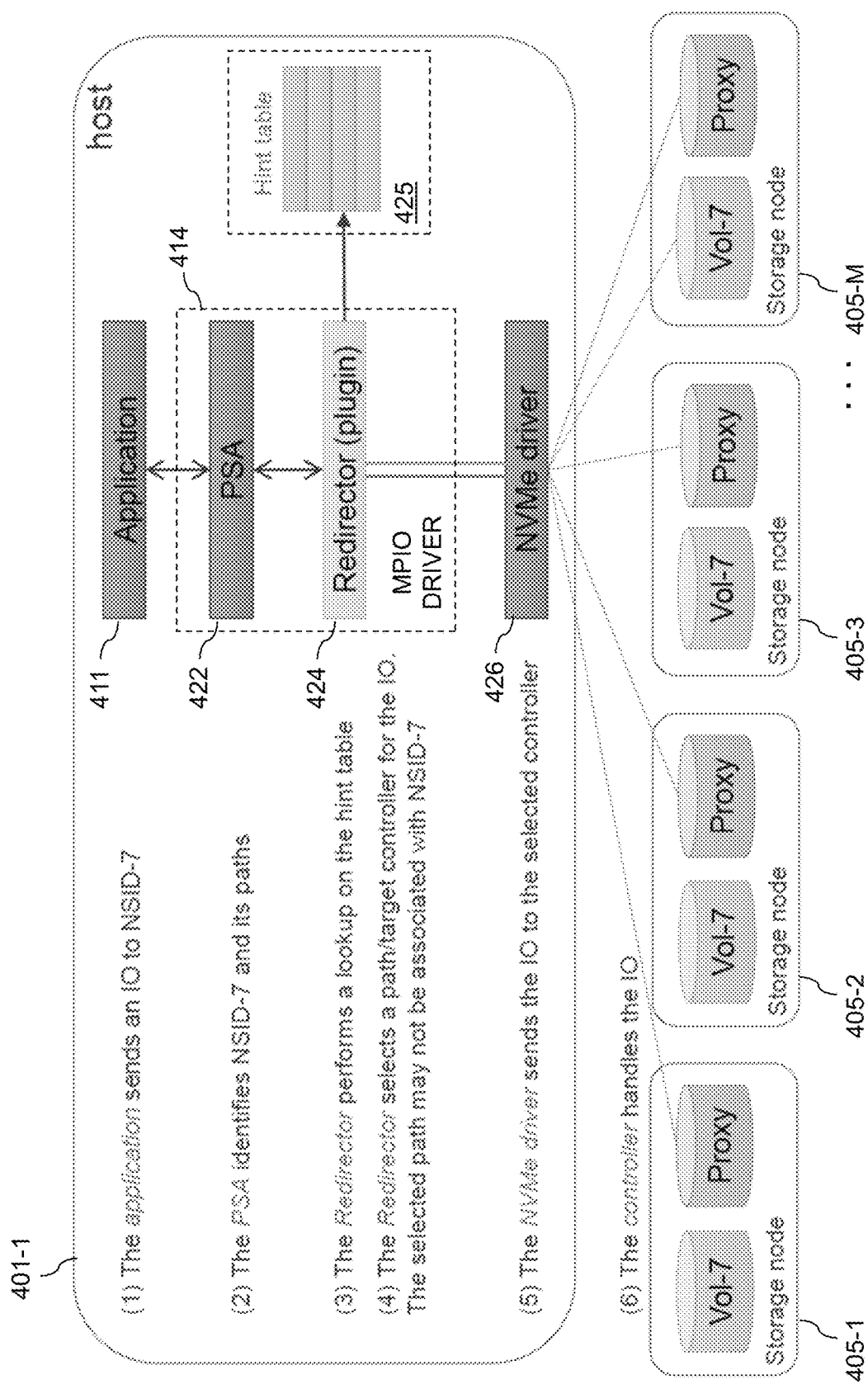
FIG. 4 is a block diagram of another information processing system incorporating functionality for proxy volume redirection in an illustrative embodiment.

FIG. 4 shows an information processing system 400 which advantageously avoids the above-noted limitations on total number of logical storage volumes and total number of paths by implementing functionality for proxy volume redirection as disclosed herein.

The system 400 comprises a host 401-1 that communicates with a plurality of storage nodes 405-1, 405-2, 405-3, . . . 405-M of a distributed storage system, illustratively over one or more networks that are not explicitly shown. The host 401-1 includes an application 411 that generates IO operations that are processed by an MPIO driver 414 for delivery to particular ones of the storage nodes 405.

The MPIO driver 414 further comprises a pluggable storage architecture (PSA) 422 and redirector 424. The PSA 422 is illustratively configured to coordinate multiple multi-pathing plugins (MPPs), and may be viewed as an example of at least a portion of what is more generally referred to herein as a multi-path layer. Other multi-path layers, including other types of pluggable multi-path layers, can be used in other embodiments.

The redirector 424 in the present embodiment is illustratively implemented as a plugin module associated with the PSA 422, although other types and arrangements of path selection logic can be used in addition to or in place of a plugin module in other embodiments. The redirector 424 has access to a data structure 425 that is implemented, in this embodiment, as a table which includes mapping information illustratively specifying, for each of a plurality of different LBA ranges of a given logical storage volume, which of the storage nodes 405 stores data for that LBA range. The table in the data structure 425 in some embodiments is more particularly referred to as a "hint table" as it provides data location indications or other types of location information that the redirector 424 utilizes in redirecting IO operations, although numerous other types and arrangements of tables can be used.

It should be noted that use of such mapping information is presented by way of illustrative example only and should not be viewed as limiting in any way. For example, in other embodiments, each of one or more of the storage nodes can provide access to an entire logical storage volume. The redirector 424 generally sends a given IO operation to the particular storage node where the corresponding targeted logical block resides. The host 401-1 illustratively receives mapping information from one or more of the storage nodes and utilizes that mapping information in directing IO operations.

In some embodiments, the MPIO driver 414 is implemented at least in part utilizing one or more additional plugins associated with the PSA 422, such as, for example, a high performance plugin (HPP) or a native multi-pathing plugin (NMP), although again other types and arrangements of path selection logic can be used.

The host 401-1 further comprises an NVMe driver 426 that interfaces with the storage nodes 405 using an NVMe storage access protocol. The NVMe driver 426 sends IO operations to particular ones of the storage nodes 405 over paths selected by the MPIO driver 414 using its redirector 424.

In this embodiment, the MPIO driver 414 of the host 401-1 associates a logical storage volume, illustratively an NVMe namespace having a namespace identifier (NSID) given by NSID=7, also referred to as NSID-7 or Vol-7, with at least one path between the host 401-1 and a particular one of the storage nodes 405. In this embodiment, as in other embodiments herein, the term "path" is intended to be broadly construed. In addition, the MPIO driver 414 associates a proxy volume with respective sets of one or more paths from the host 401-1 to each of the storage nodes 405. Accordingly, the redirector 424 can access the proxy volume via paths to any of the storage nodes 405, but has a path to Vol-7 only for one of the storage nodes 405, illustratively the storage node 405-M. The MPIO driver 414 obtains IO operations directed to Vol-7 from the application 411, and via its redirector 424, which utilizes the table in data structure 425 for path selection, redirects such IOs to the proxy volume over respective selected ones of the paths associated with the proxy volume.

For example, for a given such IO operation, the redirector 424 determines a particular LBA range of Vol-7 targeted by that IO operation, and then accesses the data structure 425 that contains the table to identify a particular one of the storage nodes 405 that stores data of the particular LBA range. The redirector 424 then selects a particular path from the set of one or more paths from the host to the identified storage node, and redirects the IO operation to that storage node over the selected path, illustratively via the NVMe driver 426.

In this embodiment, the MPIO driver 414 has path connectivity to the proxy volume on each of the storage nodes 405. However, the MPIO driver 414 exposes, in an upward direction in the figure, only a limited number of paths (e.g., two paths) for each logical storage volume, other than the proxy volume, to the host operating system and/or hypervisor. The redirector 424 utilizes the LBA range mapping information stored in the table of the data structure 425 in its path selection operations. For example, the redirector 424 receives an IO operation directed to a particular logical storage volume exposed by the MPIO driver 414, and uses the mapping information to select a particular path, corresponding to a particular initiator-target pair (e.g., an "IT nexus"), to send the IO operation to the appropriate one of the storage nodes 405. The redirector 424 is also illustratively configured to send information such as status, response and/or completion information for the IO operation upward in the host software stack in the context of one of the paths exposed by the MPIO driver 414 for the actual logical storage volume.

Assume by way of example that there are 64 storage nodes in the distributed storage system, and that the above-noted volume NSID-7 or Vol-7 is exposed only with one node/controller to application 411. The application 411 sees a namespace having only one or two paths. However, when IO is sent down for NSID-7 from the application 411, it will reach the MPIO driver 414 that implements the redirector 424. The redirector 424 determines which node holds the storage space for that IO and will then push the IO to a controller on that node. On completion of the IO, the resulting IO status is sent from that controller for the actual volume NSID-7. Above the redirector 424, that IO status uses the one or two paths for the actual volume NSID-7. The application 411 can therefore send IOs to NSID-7 without knowledge of the proxy volume. In this example in which the storage system includes 64 nodes, the proxy volume will be configured with paths to controllers on all 64 nodes, but the actual volume NSID-7 would expose just one or two paths above the redirector 424.

Accordingly, in illustrative embodiments herein, the MPIO driver 414 exposes only a limited number of paths for each of the logical storage volumes, but the redirector 424 is able to access all of the storage nodes using the paths associated with the proxy volume, thereby significantly enhancing the scalability of the distributed storage system relative to host-side restrictions such as restrictions on the total number of paths.

As shown in FIG. 4, an example set of processing steps for handling a given IO operation in the system 400 includes the following steps, although it is to be appreciated that additional or alternative steps could be used in a given embodiment:

(1) The application 411 generates an IO operation targeting the logical storage volume denoted as NSID-7 or Vol-7, and that IO operation is received or otherwise obtained by the MPIO driver 414.

(2) The PSA 422 of the MPIO driver 414 identifies NSID-7 and its corresponding paths. This will illustratively include just the two exposed paths for that logical storage volume.

(3) The redirector 424 utilizes one or more LBAs targeted by the IO operation to perform a lookup on the table in the data structure 425 to identify a particular one of the storage nodes 405 that stores data for the LBA range that includes the one or more targeted LBAs.

(4) The redirector 424 selects a path to send the IO to the identified one of the storage nodes 405. The selected path may be a path that is not associated with NSID-7, that is, it may be a path that is associated with the proxy volume. The path illustratively comprises an initiator-target pair, where the initiator comprises a particular NVMe initiator of the host 401-1 and the target comprises a particular NVMe controller of the identified storage node. As indicated above, such an initiator-target pair is also illustratively referred to in some embodiments as an IT nexus. The redirector 424 provides the IO to the NVMe driver 426.

(5) The NVMe driver 426 sends the IO operation to the selected controller of the identified storage node.

(6) The controller on the identified storage node receives and handles the IO operation. These processing steps collectively represent an example algorithm implemented by at least one processing device of the host 401-1. Again, additional or alternative processing steps can be used in other embodiments.

As indicated previously, absent use of the proxy volume redirection as disclosed herein, for a distributed storage system having n nodes and v volumes, the total path count is at least $2*n*v$, assuming two-path redundancy to each storage node. In the FIG. 4 embodiment utilizing the proxy volume and the redirector 424, since all of the logical volumes have two paths and only the proxy volume has paths to all of the storage nodes, the total number of paths exposed upward in the software stack is $(2*v)+n$. This significantly reduces the number of paths exposed in the portion of the software stack above the redirector 424, thereby increasing the scalability for access to any distributed storage system from any host operating system and/or hypervisor environment that imposes a limit on the total number of paths.

It should be noted that the distribution of the data across the storage nodes may change, for example, due to a failure or a configuration change in the distributed storage system comprising the storage nodes 405. In some embodiments, information exchanged between at least a subset of the storage nodes 405 and the MPIO driver 414 or other host components allows IOs to continue to be directed to the appropriate storage nodes 405 even when those changes happen. For example, one or more of the storage nodes 405 can each send updated location information to the redirector 424, periodically or under other specified conditions, for storage as updated mapping information in the table of the data structure 425.

The redirector 424 uses the location information it has available via the table of the data structure 425, including any updates received from one or more of the storage nodes 405. The existing location information may be stale if the redirector 424 did not receive the updated location information. If there is no location information available for a particular LBA, the redirector 424 uses a default policy, such as, for example, a round robin (RR) path selection policy, to select a path for the IO.

The distributed storage system handles any IO it receives, even if received on the "wrong" storage node. For example, a receiving storage node that does not locally store the data targeted by a given IO operation can forward that IO operation to another storage node that does locally store the targeted data.

In an example VMware ESXi environment, an ESXi NVMe driver can illustratively scale up to 256 controllers per host adapter, for example, but internally ESXi maintains an IT nexus for each logical storage volume associated with the controllers and that has a limitation of total 4096 paths for an ESXi cluster, again by way of illustrative example only. This example path limitation is advantageously overcome by the use of a proxy volume as disclosed herein, where the proxy volume is illustratively a single volume which has connectivity to all storage nodes and their associated controllers, and which is used to send IO down the ESXi software stack. This proxy volume in some embodiments has a relatively small capacity, such that it is not feasible to create a virtual machine file system (VMFS) file system on top of it, as the proxy volume is not being used for IO from production workloads (e.g., VMs). All other real logical storage volumes would be exposed with only one or two paths to the ESXi host. All IO traffic directed to those volumes will be issued through the controllers to the correct storage node based on the distribution of LBAs across storage nodes.

Figure 5:
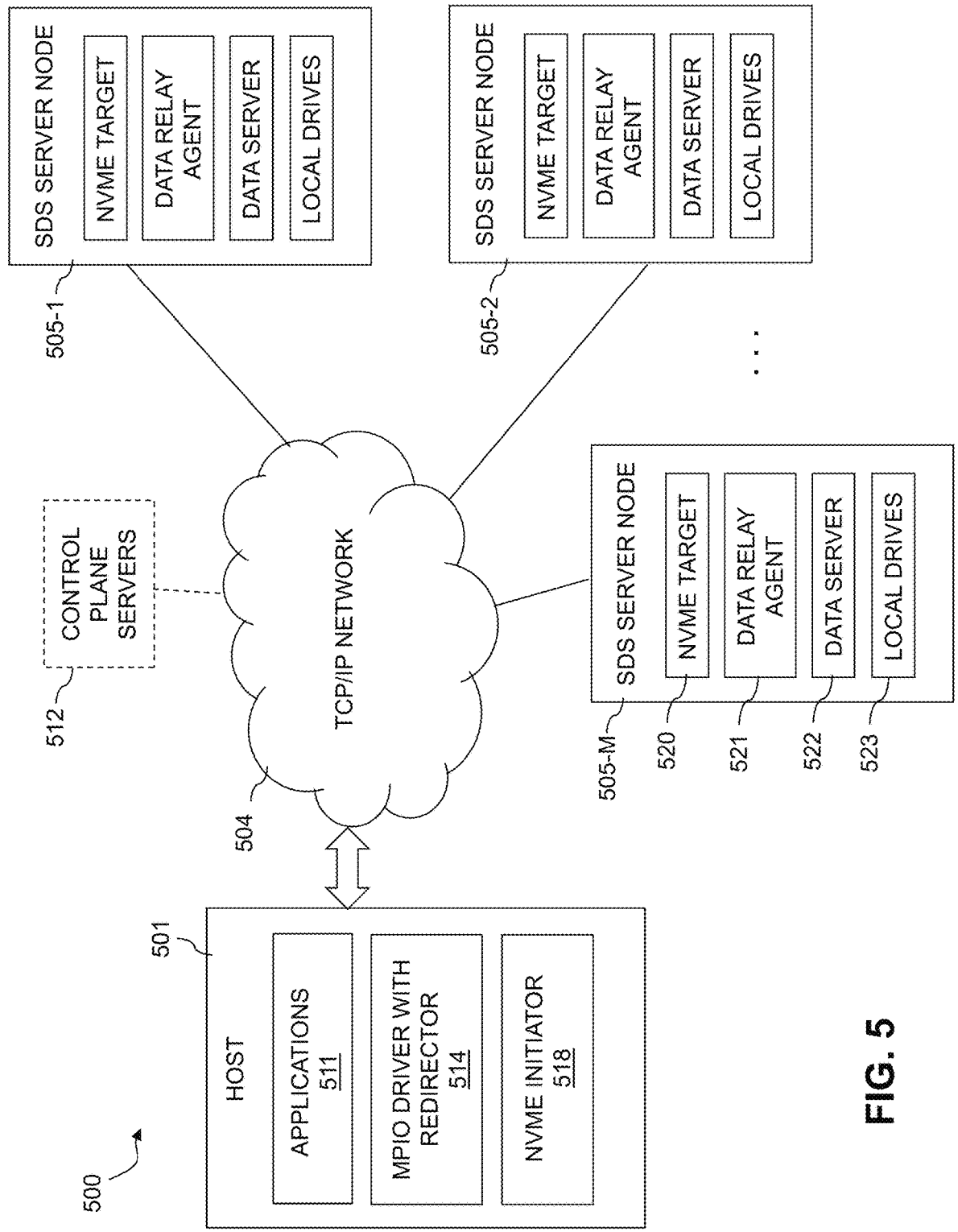
FIG. 5 shows an example of an information processing system incorporating functionality for proxy volume redirection for enhanced scalability of a software-defined storage system in an illustrative embodiment.

FIG. 5 illustrates an example of a distributed storage system that more particularly comprises a software-defined storage system having a plurality of software-defined storage server nodes, also referred to as SDS server nodes, configured to utilize an NVMe storage access protocol such as NVMe-oF or NVMe/TCP. Such SDS server nodes are examples of "storage nodes" as that term is broadly used herein. As will be appreciated by those skilled in the art, similar embodiments can be implemented without the use of software-defined storage and with other storage access protocols.

As shown in FIG. 5, an information processing system 500 comprises a host 501 configured to communicate over a network 504, illustratively a TCP/IP network, with a software-defined storage system comprising a plurality of SDS server nodes 505-1, 505-2, . . . 505-M and corresponding control plane servers 512. The control plane servers 512 are shown in dashed outline as the functionality of such servers in illustrative embodiments is distributed over a particular subset of the SDS server nodes 505 rather than being implemented on separate nodes of the software-defined storage system. The control plane servers 512 provide system management functionality such as centralized storage provisioning, monitoring, membership management, as well as storage partitioning.

A plurality of applications 511 execute on the host 501 and generate IO operations that are delivered to particular ones of the SDS server nodes 505 via at least one NVMe initiator 518. The host 501 further comprises an MPIO driver 514 that includes a redirector illustratively configured to carry out aspects of proxy volume redirection functionality of the host 501 in a manner similar to that previously described. For example, the redirector is illustratively implemented as a component of the MPIO driver 514 and has access to a table or other data structure that holds a mapping of LBA ranges to different storage nodes. The data structure accessed by the redirector can be implemented entirely or partially within the MPIO driver 514, but in other embodiments may be located at least in part elsewhere within the host 501 or within the system 500. Additionally or alternatively, in some embodiments, the redirector may be a separate component of the host 501, rather than part of the MPIO driver 514 as illustrated in the embodiment shown in the figure. Also, although only a single host 501 is shown by way of illustrative example in system 500, the system 500 can include multiple hosts, each configured as generally shown for host 501, as in the system 100 of FIG. 1.

Each of the SDS server nodes 505 in the present embodiment comprises at least one NVMe target 520, a data relay agent 521, a data server 522 and a set of local drives 523. The internal components of a given SDS server node with the exception of the local drives 523 are illustratively part of a corresponding storage processor in the FIG. 1 embodiment, although numerous other arrangements are possible.

It should also be noted that the local drives 523, although illustratively shown by way of example only as being part of their respective corresponding SDS server nodes 505, can instead be implemented in whole or in part externally to the SDS server nodes 505. Such SDS server nodes, and other storage nodes referred to herein, need not physically contain local drives, but can instead be coupled to or otherwise associated with such local drives.

The data relay agent 521 facilitates relaying of IO requests between different ones of the SDS server nodes 505, and the data servers 522 provide access to data stored in the local drives 523 of their respective SDS server nodes 505. Additional or alternative components may be included in the SDS server nodes 505 in illustrative embodiments.

Although single NVMe initiators and targets are shown in respective ones of the host 501 and the SDS server nodes 505, this is by way of simplified illustration only, and other embodiments can include multiple NVMe initiators within host 501 and multiple NVMe targets within each of the SDS server nodes 505.

In some embodiments, the SDS server nodes 505 are configured at least in part as respective PowerFlex® software-defined storage nodes from Dell Technologies, although other types of storage nodes can be used in other embodiments. These and other storage nodes can be modified in some embodiments to implement aspects of the disclosed functionality.

The NVMe targets 520 in some embodiments collectively comprise an NVM subsystem that implements multiple distinct controllers. For example, a given such NVMe target can comprise at least a first controller associated with a first storage pool of the distributed storage system, and a second controller associated with a second storage pool of the distributed storage system. Other types and arrangements of single or multiple controllers can be used, and the term "controller" as used herein is intended to be broadly construed, and should not be viewed as being limited to any particular interface type, such as NVMe or SCSI.

Also, the term "NVMe target" as used herein is intended to be broadly construed, to encompass, for example, any component that is a target of an NVMe command. Moreover, as indicated previously, terms such as "target" and "path" as used herein should not be viewed as being limited to any particular interface type, such as NVMe or SCSI.

A given one of the SDS server nodes 505 processes IO operations received from the host 501, with different ones of the IO operations being directed by the host 501 from NVMe initiator 518 to different ones of the first and second controllers of the NVMe target 520 of the given SDS server node.

In some embodiments, the host 501 communicates with the SDS server nodes 505 via a plurality of TCP associations including at least a first TCP association and a second TCP association, although other communication arrangements can be used. A given such "TCP association" as that term is broadly used herein illustratively comprises one or more TCP connections of an association between a host and a controller. For example, an association between a host and a controller may comprise multiple TCP connections, one for an Admin Queue and one for each of a plurality of IO queues.

The NVMe targets 520 in some embodiments comprise respective NVM subsystems. The NVM subsystem is an example of what is more generally referred to herein as a "target" of the storage system, and each of the SDS server nodes 505 can include multiple such targets, each illustratively implemented as a separate NVM subsystem.

The NVM subsystem in some embodiments comprises at least a first controller and a second controller, with the first and second controllers being associated with respective distinct storage pools of the storage system. In other embodiments, the NVM subsystem can comprise more than two controllers, each associated with one or more storage pools. Accordingly, other embodiments can include only a single storage pool, or can involve different associations between multiple controllers and multiple storage pools. The NVM subsystem in the present embodiment is illustratively a single physical controller component of the storage system, and the first and second controllers may be viewed as comprising respective virtual controllers associated with that single physical controller component, although numerous other arrangements are possible in other embodiments.

The storage system processes IO operations received from the host 501 via the TCP associations. For example, the host 501 illustratively directs IO operations from the NVMe initiator 518 to the first controller via the first TCP association, and directs IO operations from the NVMe initiator to the second controller via the second TCP association. The first and second controllers may comprise respective first and second sets of IO queues. Also the above-noted TCP associations are in the context of NVMe/TCP, the disclosed techniques are more broadly applicable to other contexts, including by way of example other NVMe-OF transport contexts, such as FC and RDMA.

The capacities of the first and second sets of IO queues of the respective first and second controllers may be made different from one another by configuring those first and second sets of IO queues to have at least one of a different number of IO queues and a different IO queue size relative to one another, although in other embodiments the first and second sets of IO queues may have the same capacity.

In some embodiments, the NVMe targets 520, each illustratively comprising one or more NVM subsystems, may be configured as a software-defined target or SDT of the software-defined storage system. Such a target can be implemented at least in part as a Linux user space component, illustratively comprising a daemon listening for incoming TCP connections from one or more NVMe initiators 518 of the host 501. The NVMe target comprising a given NVM subsystem is illustratively accessible from the host 501 via one or more TCP associations, each of which may be associated with a different one of the above-noted first and second controllers of the NVM subsystem.

These and other features of illustrative embodiments are presented by way of example only, and can be varied in other embodiments. For example, the disclosed proxy volume redirection techniques can be implemented using additional or alternative components of one or more hosts, configured to interact with additional or alternative components of storage nodes of a distributed storage system.

The above-described illustrative embodiments can provide significant advantages over conventional approaches.

For example, illustrative embodiments disclosed herein provide techniques for proxy volume redirection that facilitates connectivity to all storage nodes of a distributed storage system, using fewer paths than would otherwise be required to do so, thereby alleviating path number restrictions of host device environments. Again, as described elsewhere herein, the term "path" is intended to be broadly construed, and should not be viewed as limited to particular illustrative arrangements, such as an IT nexus and/or an ITL nexus.

These and other embodiments can significantly increase the scalability of the distributed storage system, overcoming the limitations of conventional arrangements in which scalability is limited, for example, as a function of the product of the number of storage nodes and the number of logical storage volumes. Instead, disclosed embodiments provide enhanced scalability, for example, as a function of the sum of the number of storage nodes and the number of logical storage volumes, thereby accommodating a substantially larger number of storage nodes for a given number of logical storage volumes.

Illustrative embodiments disclosed herein can operate with any storage protocol such as those based on NVMe and/or SCSI on any host operating system and with any scale-out distributed storage system configuration.

These and other disclosed embodiments provide the scalability needed by a distributed storage system within host software stacks in current architectures, such as, for example, VMware environments. Moreover, such improvements are provided without adverse impacts to applications and the associated host software stacks.

Illustrative embodiments disclosed herein overcome the challenges of general multi-path software support of scale-out storage distribution and provide a solution, illustratively in a VMware environment as one example, that addresses the problem in an efficient manner without introducing significant additional complications, such as requiring installation of a storage-system-specific driver in each host.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement hosts and distributed storage systems with proxy volume redirection functionality will now be described in greater detail with reference to FIGS. 6 and 7. Although described in the context of system 100, these platforms may also be used to implement at least portions of other information processing systems in other embodiments.

Figure 6:
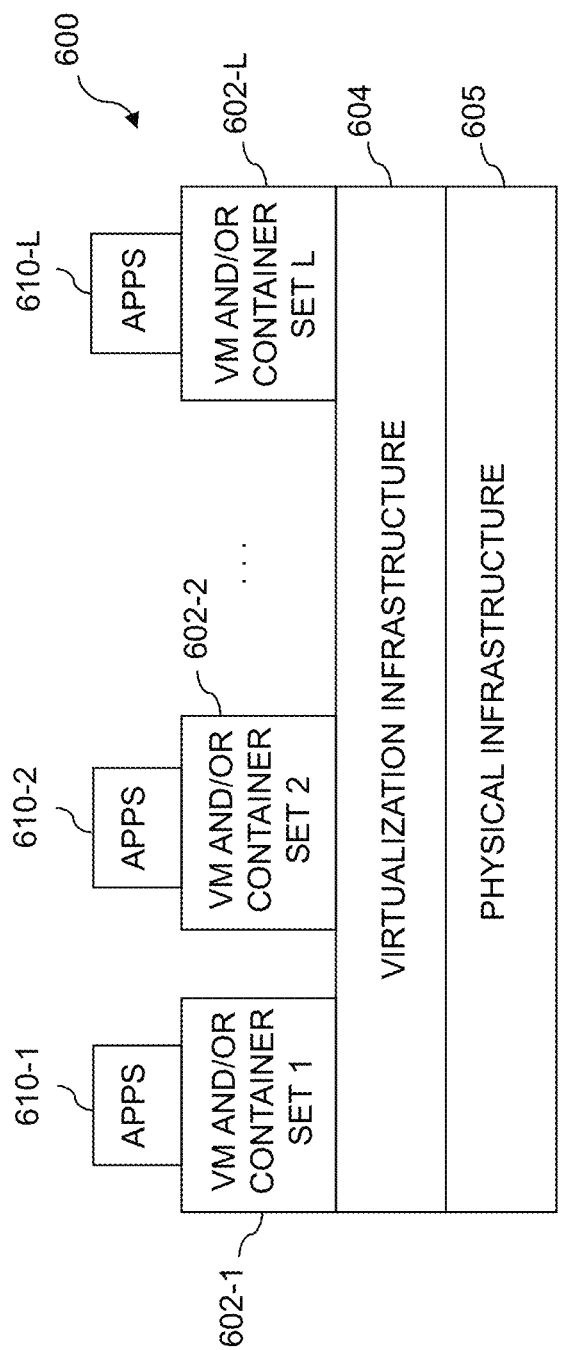
FIGS. 6 and 7 show examples of processing platforms that may be utilized to implement at least a portion of an information processing system in illustrative embodiments.
Figure 7:
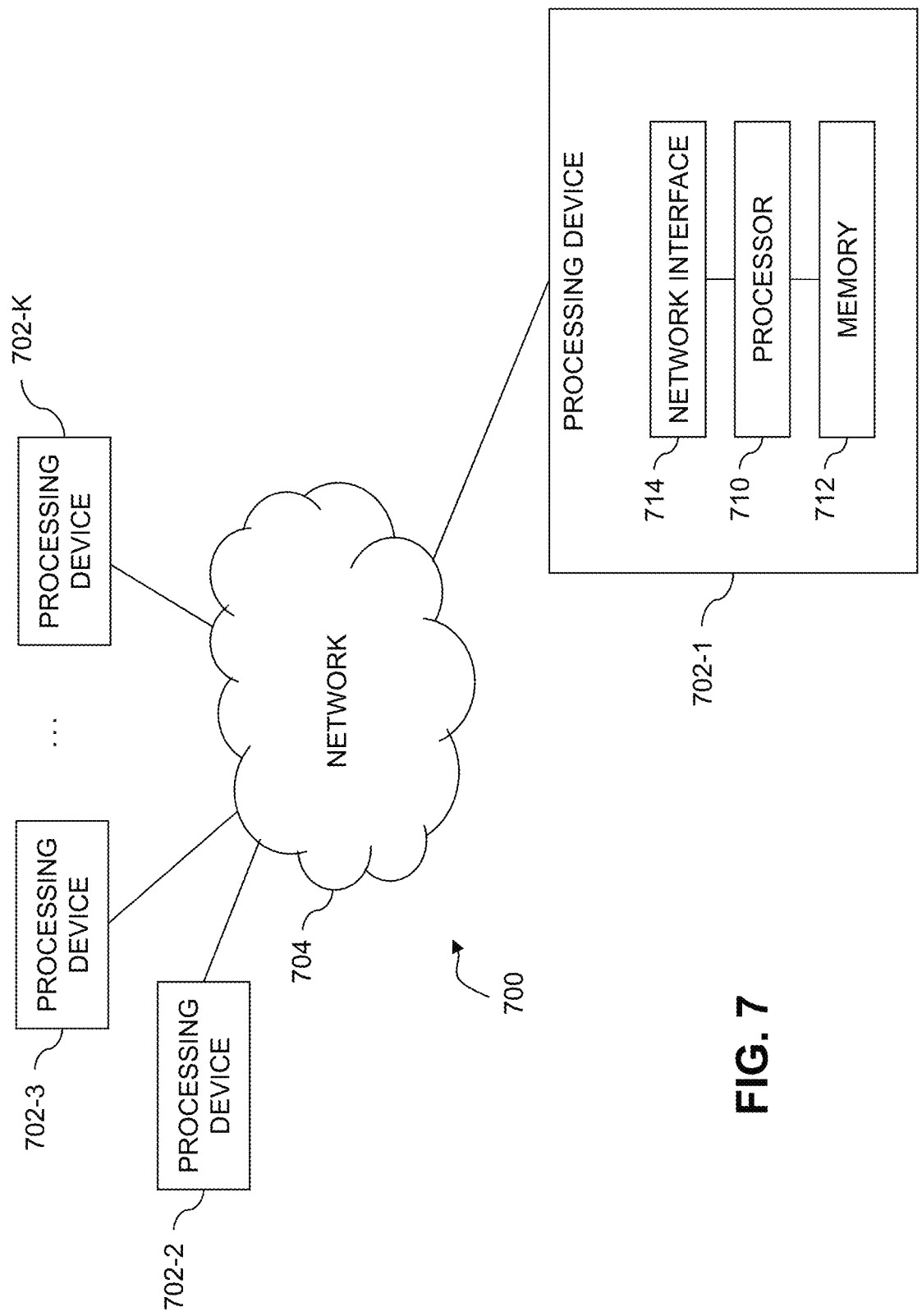

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide proxy volume redirection functionality in a distributed storage system of the type described above using one or more processes running on a given one of the VMs. For example, each of the VMs can implement logic instances and/or other components for implementing functionality associated with proxy volume redirection in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide proxy volume redirection functionality in a distributed storage system of the type described above. For example, a container host supporting multiple containers of one or more container sets can implement logic instances and/or other components for implementing functionality associated with proxy volume redirection in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the proxy volume redirection functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, hosts, storage systems, storage nodes, storage devices, storage processors, initiators, targets, MPIO drivers, multi-path layers, redirectors and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to associate a logical storage volume with at least one path between a host and at least a given one of a plurality of storage nodes of a distributed storage system, each of the storage nodes storing corresponding portions of the logical storage volume and one or more additional logical storage volumes, a given such logical storage volume being stored in a distributed manner over the storage nodes with different address ranges of the given logical storage volume being stored in different ones of the storage nodes;

to associate a proxy volume with respective sets of one or more paths from the host to each of the plurality of storage nodes of the distributed storage system;

to obtain an input-output operation directed to the logical storage volume; and to redirect the input-output operation to the proxy volume over a selected one of the paths associated with the proxy volume;

wherein the host is configured to expose a first number of paths to at least one application executing on the host, the first number of paths being determined collectively across all of the logical storage volumes accessible to the at least one application; and wherein associating the proxy volume with the respective sets of one or more paths from the host to each of the plurality of storage nodes provides the host with access to a second number of paths that is greater than the first number of paths.

2. The apparatus of claim 1 wherein the at least one processing device comprises at least a portion of the host.

3. The apparatus of claim 1 wherein the host comprises a plurality of initiators and supports one or more paths between each of the initiators and one or more targets on each of the storage nodes.

4. The apparatus of claim 1 wherein the distributed storage system comprises a software-defined storage system and the storage nodes comprise respective software-defined storage server nodes of the software-defined storage system.

5. The apparatus of claim 1 wherein the host comprises a multi-path layer that includes at least one multi-path input-output driver configured to perform at least portions of the associating the logical storage volume, the associating the proxy volume, the obtaining the input-output operation and the redirecting the input-output operation.

6. The apparatus of claim 1 wherein the logical storage volume is associated with at least first and second paths between the host and the given storage node of the plurality of storage nodes.

7. The apparatus of claim 1 wherein redirecting the input-output operation to the proxy volume over a selected one of the paths associated with the proxy volume comprises:

determining a particular portion of the logical storage volume targeted by the input-output operation;

accessing at least one data structure to identify a particular one of the plurality of storage nodes that stores data of the particular portion of the logical storage volume; and selecting a particular path from the set of one or more paths from the host to the identified storage node.

8. The apparatus of claim 7 wherein the at least one data structure comprises a table.

9. The apparatus of claim 7 wherein the at least one data structure stores mapping information that maps portions of the logical storage volume to respective ones of the storage nodes that store data of those portions.

10. The apparatus of claim 9 wherein the mapping information is obtained at least in part from one or more of the storage nodes.

11. The apparatus of claim 9 wherein the mapping information is periodically updated to reflect configuration changes relating to the distributed storage system.

12. The apparatus of claim 1 wherein the logical storage volume is associated with no more than a maximum number of paths per volume for the logical storage volume and the proxy volume is associated with a number of paths that is larger than the maximum number of paths per volume for the logical storage volume.

13. The apparatus of claim 12 wherein the maximum number of paths per volume for the logical storage volume is two paths.

14. The apparatus of claim 1 wherein the proxy volume is associated with a number of paths that is a function of the number of storage nodes in the plurality of storage nodes.

15. A computer program product comprising a non-transitory processor-readable storage medium having stored therein program code of one or more software programs, wherein the program code when executed by at least one processing device comprising a processor coupled to a memory, causes the at least one processing device:

to associate a logical storage volume with at least one path between a host and at least a given one of a plurality of storage nodes of a distributed storage system, each of the storage nodes storing corresponding portions of the logical storage volume and one or more additional logical storage volumes, a given such logical storage volume being stored in a distributed manner over the storage nodes with different address ranges of the given logical storage volume being stored in different ones of the storage nodes;

to associate a proxy volume with respective sets of one or more paths from the host to each of the plurality of storage nodes of the distributed storage system;

to obtain an input-output operation directed to the logical storage volume; and to redirect the input-output operation to the proxy volume over a selected one of the paths associated with the proxy volume;

wherein the host is configured to expose a first number of paths to at least one application executing on the host, the first number of paths being determined collectively across all of the logical storage volumes accessible to the at least one application; and wherein associating the proxy volume with the respective sets of one or more paths from the host to each of the plurality of storage nodes provides the host with access to a second number of paths that is greater than the first number of paths.

16. The computer program product of claim 15 wherein the host comprises a multi-path layer that includes at least one multi-path input-output driver configured to perform at least portions of the associating the logical storage volume, the associating the proxy volume, the obtaining the input-output operation and the redirecting the input-output operation.

17. The computer program product of claim 15 wherein redirecting the input-output operation to the proxy volume over a selected one of the paths associated with the proxy volume comprises:

determining a particular portion of the logical storage volume targeted by the input-output operation;

accessing at least one data structure to identify a particular one of the plurality of storage nodes that stores data of the particular portion of the logical storage volume; and selecting a particular path from the set of one or more paths from the host to the identified storage node.

18. A method comprising:

associating a logical storage volume with at least one path between a host and at least a given one of a plurality of storage nodes of a distributed storage system, each of the storage nodes storing corresponding portions of the logical storage volume and one or more additional logical storage volumes, a given such logical storage volume being stored in a distributed manner over the storage nodes with different address ranges of the given logical storage volume being stored in different ones of the storage nodes;

associating a proxy volume with respective sets of one or more paths from the host to each of the plurality of storage nodes of the distributed storage system;

obtaining an input-output operation directed to the logical storage volume; and redirecting the input-output operation to the proxy volume over a selected one of the paths associated with the proxy volume;

wherein the host is configured to expose a first number of paths to at least one application executing on the host, the first number of paths being determined collectively across all of the logical storage volumes accessible to the at least one application;

wherein associating the proxy volume with the respective sets of one or more paths from the host to each of the plurality of storage nodes provides the host with access to a second number of paths that is greater than the first number of paths; and wherein the method is performed by at least one processing device comprising a processor coupled to a memory.

19. The method of claim 18 wherein the host comprises a multi-path layer that includes at least one multi-path input-output driver configured to perform at least portions of the associating the logical storage volume, the associating the proxy volume, the obtaining the input-output operation and the redirecting the input-output operation.

20. The method of claim 18 wherein redirecting the input-output operation to the proxy volume over a selected one of the paths associated with the proxy volume comprises:

determining a particular portion of the logical storage volume targeted by the input-output operation;

accessing at least one data structure to identify a particular one of the plurality of storage nodes that stores data of the particular portion of the logical storage volume; and selecting a particular path from the set of one or more paths from the host to the identified storage node.

21. The apparatus of claim 1 wherein the host is subject to a host-side restriction specifying a maximum number of paths that can be exposed to the at least one application executing on the host, the maximum number of paths being determined collectively across all of the logical storage volumes accessible to the at least one application, and wherein associating the proxy volume with the respective sets of one or more paths from the host to each of the plurality of storage nodes provides the host with access to a total number of paths that is greater than the specified maximum number of paths.

* * * * *